United States Patent
Anaya (10) Patent No.: US 11,458,903 B2
(45) Date of Patent: Oct. 4, 2022

(54) VEHICLE STORAGE ASSEMBLY

(71) Applicant: Ford Global Technologies, LLC, Dearborn, MI (US)

(72) Inventor: Oscar Anaya, Tlalnepantla (MX)

(73) Assignee: Ford Global Technologies, LLC, Dearborn, MI (US)

( * ) Notice: Subject to any disclaimer, the term of this patent is extended or adjusted under 35 U.S.C. 154(b) by 160 days.

(21) Appl. No.: 16/950,990

(22) Filed: Nov. 18, 2020

(65) Prior Publication Data

US 2022/0153200 A1 May 19, 2022

(51) Int. Cl.
*B60R 7/02* (2006.01)

(52) U.S. Cl.
CPC ........................ *B60R 7/02* (2013.01)

(58) Field of Classification Search
CPC .. B60R 5/04; B60R 5/045; B60R 7/02; B60R 7/04
USPC ..... 296/37.1, 37.16, 37.3, 24.4, 37.8, 37.14, 296/37.5
See application file for complete search history.

(56) References Cited

U.S. PATENT DOCUMENTS

| | | | |
|---|---|---|---|
| 6,050,202 A | 4/2000 | Thompson | |
| 6,056,177 A * | 5/2000 | Schneider | B60R 5/04 224/539 |
| 6,290,277 B1 * | 9/2001 | Spykerman | B60R 5/04 296/37.16 |
| 6,457,690 B1 * | 10/2002 | Spykerman | B60R 7/10 224/313 |
| 7,059,646 B1 * | 6/2006 | DeLong | B60R 5/04 296/37.16 |
| 7,661,742 B2 * | 2/2010 | Medlar | B60R 5/04 296/37.16 |
| 7,762,602 B2 | 7/2010 | Bohlke et al. | |
| 8,814,245 B1 * | 8/2014 | Welch | B60R 5/04 296/37.16 |
| 11,279,300 B1 * | 3/2022 | Line | B60R 13/013 |
| 2003/0090120 A1 * | 5/2003 | Barber | B60R 5/04 224/539 |
| 2003/0141423 A1 * | 7/2003 | Gordon | B60R 7/10 224/313 |
| 2006/0180623 A1 | 8/2006 | Reynolds et al. | |
| 2009/0108639 A1 * | 4/2009 | Sturt | B60N 2/36 297/15 |
| 2013/0038080 A1 * | 2/2013 | Tate, Jr. | B60R 7/043 296/37.5 |

(Continued)

FOREIGN PATENT DOCUMENTS

| | | | | |
|---|---|---|---|---|
| CN | 106541996 A | * | 3/2017 | ............... B60R 5/04 |
| FR | 2821035 A1 | * | 8/2002 | ............... B60R 5/04 |
| FR | 2828459 A1 | | 2/2003 | |

OTHER PUBLICATIONS

CN-106541996-A machine translation.*

*Primary Examiner* — D Glenn Dayoan
*Assistant Examiner* — Kevin P Weldon
(74) *Attorney, Agent, or Firm* — Vichit Chea; Price Heneveld LLP (57) ABSTRACT

A storage assembly for a vehicle includes retention features that are operable between a first position and a second position. A receiving portion defines a first opening and a second opening. A support body is coupled to the receiving portion via at least one coupling member, and a retention member is operably coupled to the support body and is selectively coupled to the retention features.

9 Claims, 10 Drawing Sheets

(56) References Cited

U.S. PATENT DOCUMENTS

| | | | |
|---|---|---|---|
| 2013/0249232 A1* | 9/2013 | Dinger | B60R 7/02 296/37.5 |
| 2017/0120811 A1* | 5/2017 | Salter | B60R 7/02 |
| 2017/0129412 A1* | 5/2017 | Lewis | B60P 7/0807 |
| 2021/0129736 A1* | 5/2021 | Mamo | B60R 5/04 |
| 2022/0227300 A1* | 7/2022 | Harmon | B60R 5/045 |

* cited by examiner

VEHICLE STORAGE ASSEMBLY

FIELD OF THE DISCLOSURE

The present disclosure generally relates to a vehicle storage assembly. More specifically, the present disclosure generally relates to a storage feature for a vehicle storage assembly.

BACKGROUND OF THE DISCLOSURE

Vehicles have a trunk space that is configured to store items. The trunk space is typically an open space to store the user's items, such that the user's items may be placed or stacked within the trunk space.

SUMMARY OF THE DISCLOSURE

According to a first aspect of the present disclosure, a vehicle storage assembly includes a cargo floor that is operable between an open position and a closed position. A storage feature is operably coupled to the cargo floor. The storage feature includes a base that has a first end and a second end, a first supporting member that is operably coupled to the first end of the base, a second supporting member that is operably coupled to the second end of the base, a central support that is operably coupled to the base between a first supporting member and a second supporting member, and a support body that is operably coupled to the central support and the first and second supporting members. The support body is operable between a first position, a second position, and an intermediate position therebetween.

Embodiments of the first aspect of the disclosure can include any one or a combination of the following features:
- the central body and the first and second supporting members include a receiving portion of the storage feature;
- a first opening is defined by the first supporting member and the central support;
- a second opening is defined by the second supporting member and the central support;
- the receiving portion of the storage feature is proximate to the cargo floor in the open position of the cargo floor;
- the receiving portion is proximate to the cargo floor in the first position of the support body;
- the first position of the support body is a lowered position and the second position of the support body is a raised position;
- the support body is in the intermediate position when the cargo floor is in the open position;
- a seating row has a rear surface that defines apertures;
- retention features are operably coupled to the rear surface of the seating row and are selectively disposed within the apertures in a retracted position of the retention features;
- a retention member is operably coupled to the support body of the storage feature and is selectively coupled to the retention features; and/or
- the retention member is coupled to the retention features in the second position of the storage body.

According to a second aspect of the present disclosure, a vehicle includes a seating row that has a rear surface. A cargo floor is proximate to the rear seating row. Retention features are operably coupled to the rear surface of the rear seating row. A storage feature is selectively coupled to the retention features and includes a base that is operably coupled to the cargo floor, a receiving portion, and a support body that is operably coupled to the receiving portion via at least one coupling member. The storage feature is operable between a first position and a second position.

Embodiments of the second aspect of the disclosure can include any one or a combination of the following features:
- the rear surface of the seating row defines apertures;
- the retention features are disposed within the apertures in a retracted position;
- the at least one coupling member includes a first coupling member that is operably coupled to the base and the receiving portion of the storage feature;
- a second coupling member is operably coupled to the receiving portion and the support body of the storage feature;
- a retention member is operably coupled to the support body of the storage feature and is selectively coupled to the rear surface of the seating row via the retention features;
- the first position of the storage feature is defined by the receiving portion being adjacent to the cargo floor;
- the second position is defined as a support position of the storage feature;
- the first position includes a stored position and an abutting position;
- the storage feature is planar with the cargo floor in the stored position;
- the storage feature is proximate to the rear surface of the seating row in the abutting position; and/or
- the receiving portion includes a support member and one or more openings that are defined in part by the support member.

According to a third aspect of the present disclosure, a storage assembly for a vehicle includes retention features that are operable between a first position and a second position. A receiving portion defines a first opening and a second opening. A support body is coupled to the receiving portion via at least one coupling member, and a retention member is operably coupled to the support body and is selectively coupled to the retention features.

Embodiments of the third aspect of the disclosure can include any one or a combination of the following features:
- the receiving portion includes a support member that at least partially defines the first and second opening;
- a base is operably coupled to the receiving portion and is configured to operably couple the receiving portion to a cargo floor of said vehicle;
- the receiving portion is operable between an access position, an abutting position, and an intermediate position therebetween;
- the support body is operable between a raised position and a lowered position;
- the support body is in the raised position when the receiving portion is in the access position;
- the support body includes a first surface and a second surface;
- the receiving portion is proximate to the second surface in the abutting position of the receiving portion and the lowered position of the support body;
- the second position of the retention features is in an extended position; and/or
- the retention member is operably coupled to the retention features in the extended position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the presently disclosed device will be set forth in the detailed description which follows and will be apparent to those skilled in the art from the description, or recognized by practicing the device as described in the following description, together with the claims and appended drawings.

Figure 1:
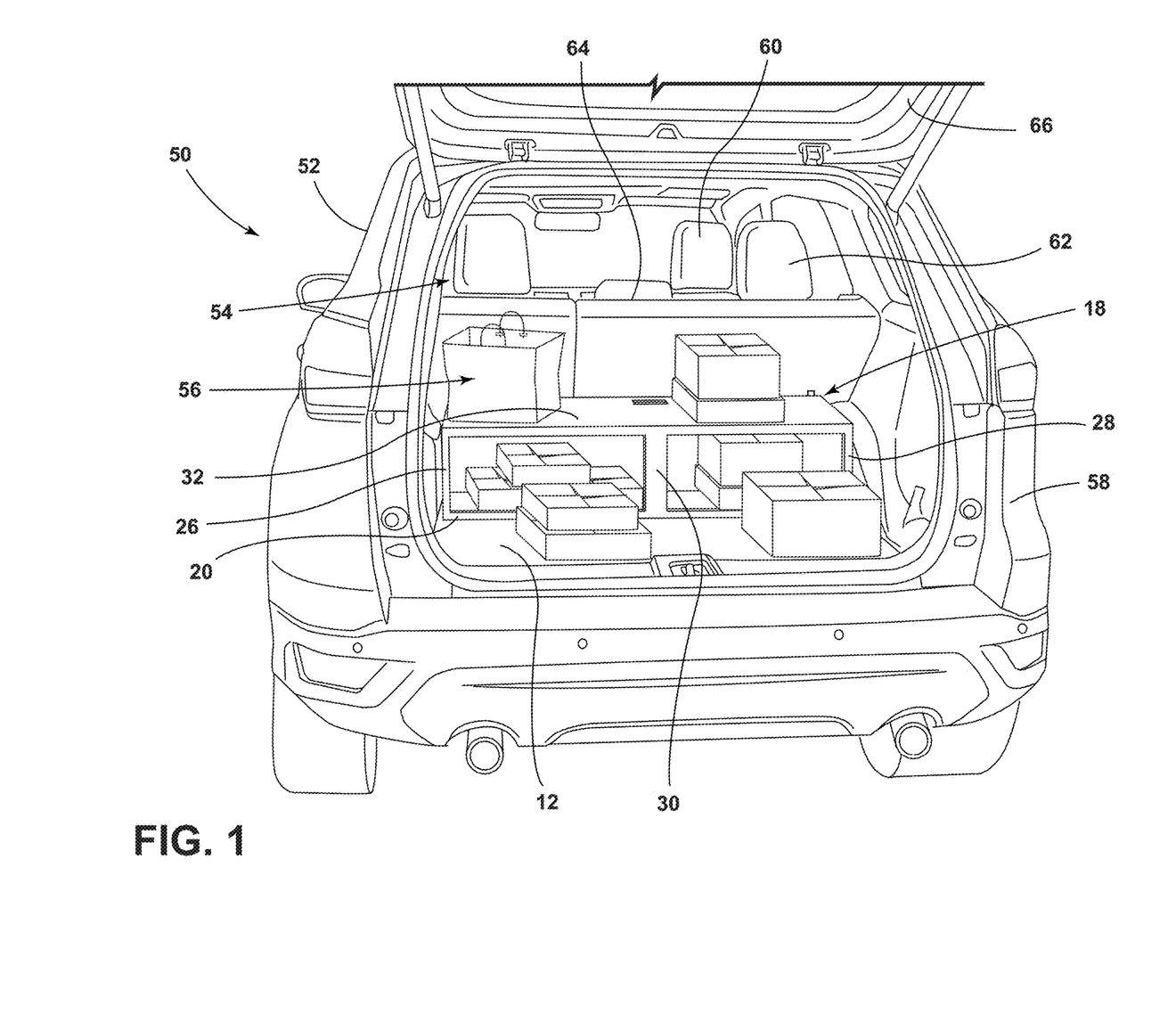
FIG. 1 is a rear perspective view of a vehicle with a storage feature of the present disclosure.
Figure 2:
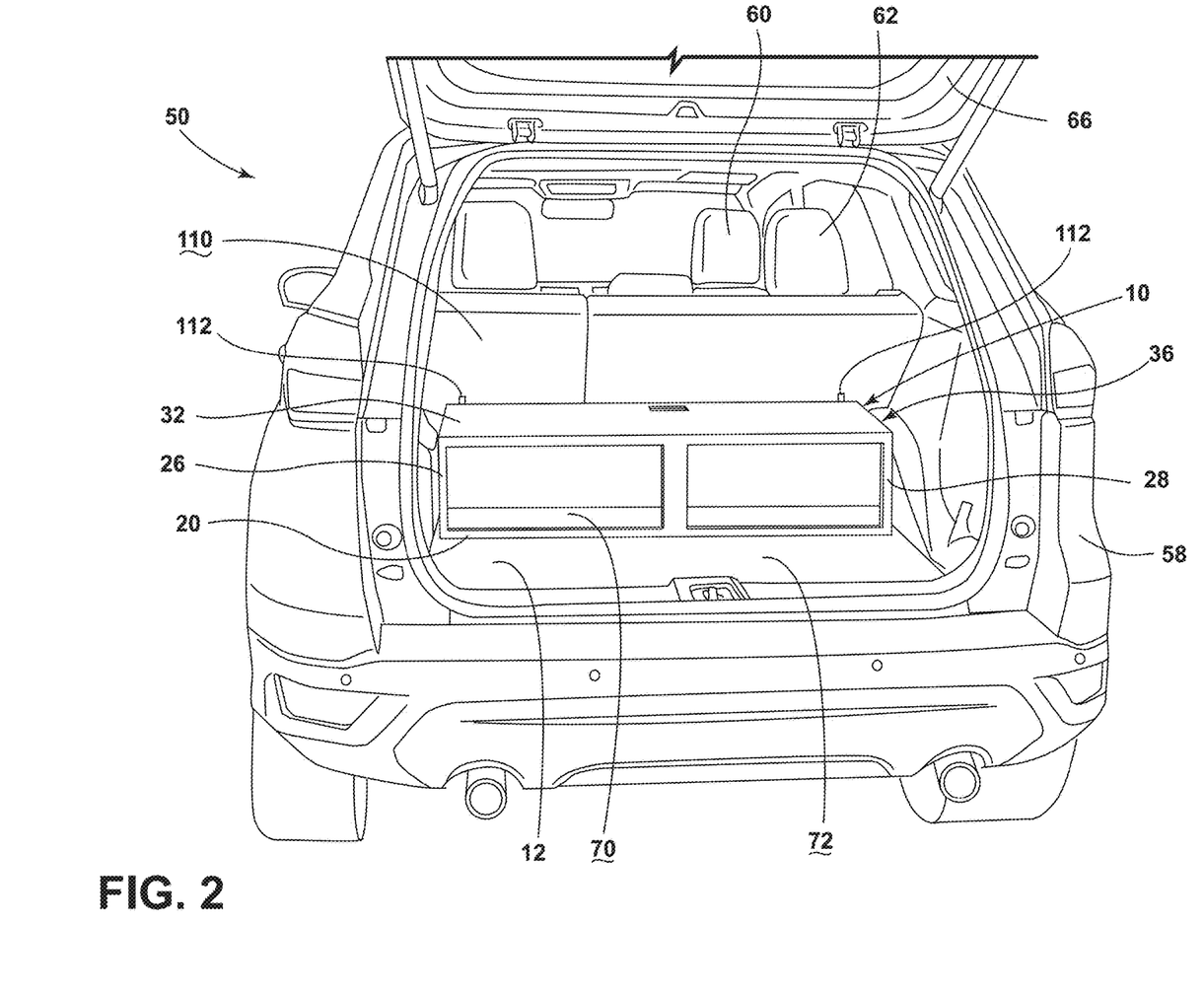
FIG. 2 is a rear perspective view of a vehicle with a storage feature of the present disclosure in a raised position.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-10, reference number 10 generally refers to a vehicle storage assembly including a cargo floor 12 that is operable between an open position 14 and a closed position 16. A storage feature 18 is operably coupled to the cargo floor 12 and includes a base 20 that has a first end 22 and a second end 24. A first supporting member 26 is operably coupled to the first end 22 of the base 20, and a second supporting member 28 is operably coupled to the second end 24 of the base 20. A central support member 30 is operably coupled to the base 20 between the first supporting member 26 and the second supporting member 28. A support body 32 is operably coupled to the central support member 30 and the first and second supporting members 26, 28. The support body 32 is operable between a first position 34, a second position 36, and an intermediate position 38 therebetween.

Referring to FIGS. 1-4, the vehicle storage assembly 10 is disposed within a vehicle 50 which includes a vehicle body 52 that defines an interior 54 of the vehicle 50. A cargo space 56 is further defined within the interior 54 of the vehicle body 52, such that the cargo space 56 is defined toward a rear portion 58 of the vehicle 50. Stated differently, the cargo space 56 may be referred to as the trunk space of the vehicle

50. The interior 54 of the vehicle 50 may include a first seating row 60 and a second seating row 62. Fewer or more seating rows may be included in the vehicle 50 without departing from the teachings herein. It is generally contemplated that the cargo space 56 may be at least partially defined by a rear seating row 64, illustrated herein as the second seating row 62, and a rear door 66 of the vehicle 50.

In various examples, the vehicle 50 is a wheeled motor vehicle 50, which may be a sedan, a sport utility vehicle, a truck, a van, a crossover, and/or other styles of vehicle. The vehicle 50 may be a manually operated vehicle (e.g., with a human driver), a fully autonomous vehicle (e.g., no human driver), or a partially autonomous vehicle (e.g., may be operated with or without a human driver). Additionally, the vehicle 50 may be utilized for personal and/or commercial purposes, such as ride-providing services (e.g., chauffeuring) and/or ride-sharing services.

Figure 4:
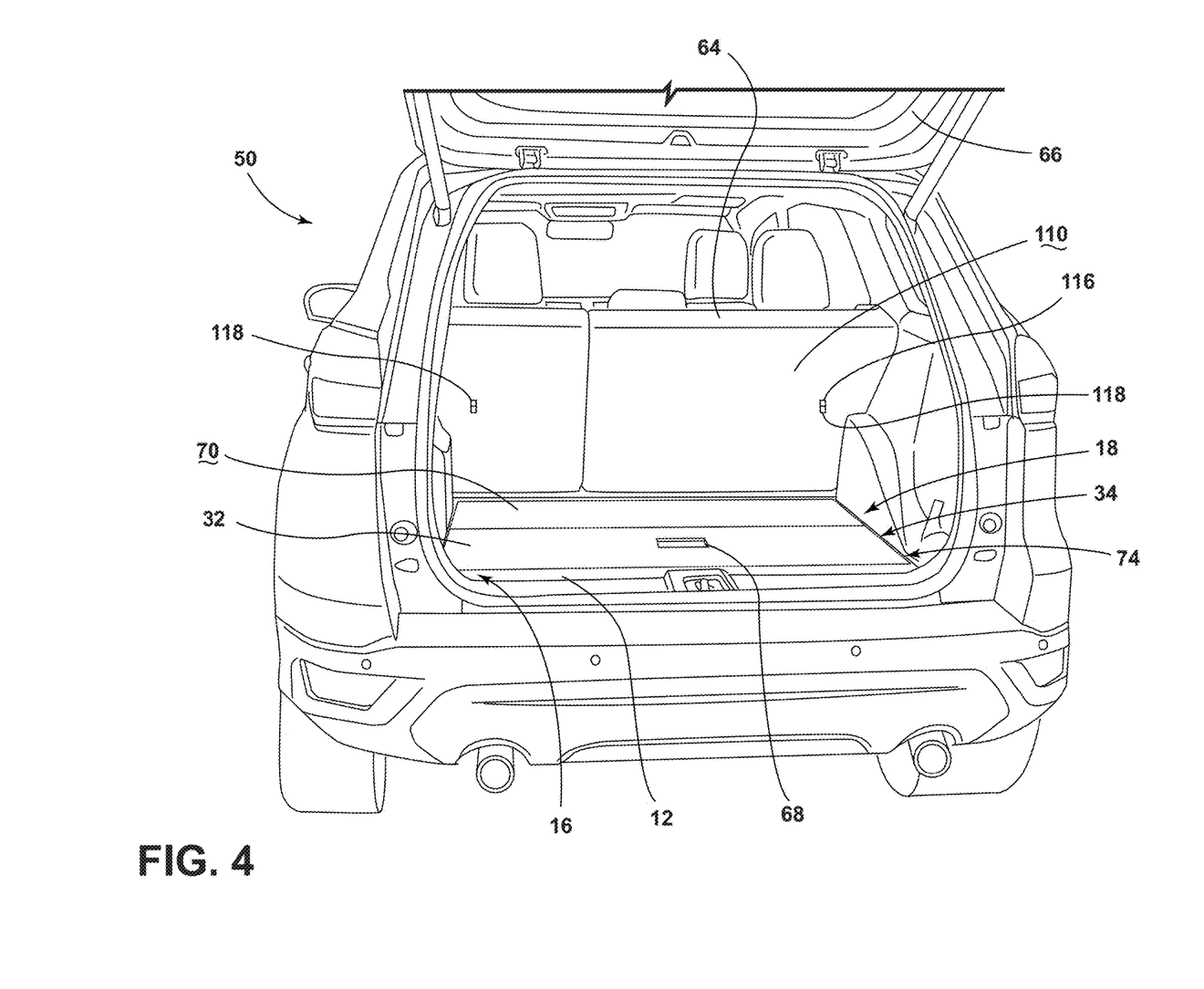
FIG. 4 is a rear perspective view of a cargo space of a vehicle with a storage feature of the present disclosure in a lowered and a stored position.

As illustrated in FIG. 4, the storage feature 18 is disposed in a lowered position, such that the storage feature 18 is generally parallel with the cargo floor 12. It is generally contemplated that the lowered position can correspond with the first position 34 of the support body 32. The storage feature 18 includes a handle 68 that is defined on the support body 32 and is configured to translate the storage feature 18 between the lowered position and a raised position, illustrated in FIG. 2. The raised position may correspond to the second position 36 of the support body 32, such that the second position 36 of the support body 32 may be referred to as the raised position 36 of the support body 32. Additionally or alternatively, the second position 36 may also be referred to as a support position as well as the raised position as items may be supported by the support body 32 in the support positions 32. Similarly, the first position 34 of the storage feature 18 may be referred to as the lowered position 34 of the support body 32. Although the raised and lowered positions 36, 34 are described in relation to the support body 32, it is generally contemplated that each of the lowered position 34 and the raised position 36 may refer to the overall position of the storage feature 18.

With further reference to FIGS. 1-4, it is generally contemplated that the cargo floor 12 may have a raised surface 70 and a recessed surface 72, such that the storage feature 18 is generally positioned within the recessed surface 72 of the cargo floor 12. Although described herein as having the raised surface 70 and the recessed surface 72, it is contemplated that the cargo floor 12 can have a single, uniform surface. The storage feature 18 can be retained along the recessed surface 72 in the lowered position 34 of the storage feature 18. In such configuration, the storage feature 18 is generally coplanar with the raised surface 70 of the cargo floor 12 in the lowered position 34 and at least partially covers the recessed surface 72. In the lowered position 34, it is generally contemplated that the support body 32 may appear to be uniform with the cargo floor 12.

The base 20 of the storage feature 18 is operably coupled to the recessed surface 72 of the cargo floor 12. The base 20 of the storage feature 18 generally has a height that corresponds to a height of the raised surface 70 relative to the recessed surface 72 of the cargo floor 12. As mentioned above, the storage feature 18 is operable between the lowered position 34 and the raised position 36, such that the first position 34 generally corresponds to the lowered position 34, and the second position 36 generally corresponds to the raised position 36. It is also contemplated that the first position 34 may include a stored position 74, generally similar to the lowered position 34. Like the lowered position 34, the storage feature 18 is generally coplanar with the raised surface 70 of the cargo floor 12 in the stored position 74. The stored position 74 generally corresponds to the storage feature 18 being operably coupled to the recessed surface 72. The storage feature 18 is generally fixed in the stored position 74. Comparatively, the storage feature 18 may be in the lowered position 34 and remain uncoupled to the recessed surface 72. This relationship is described in further detail below.

As mentioned above, the first and second supporting members 26, 28 are operably coupled to the base 20 at the first end 22 and the second end 24, respectively. It is generally contemplated that the first and second supporting members 26, 28 and the central support member 30 define a receiving portion 80 of the storage feature 18. The base 20 is operably coupled to the receiving portion 80 and is configured to operably couple the receiving portion 80 to the cargo floor 12. The receiving portion 80 defines a first opening 82 and a second opening 84.

The first opening 82 is generally defined by the first supporting member 26 and the central support member 30, and the second opening 84 is generally defined by the second supporting member 28 and the central support member 30. Stated differently, it is generally contemplated that the central support member 30, also referred to as the support member 30, at least partially defines the first and second opening 82, 84. It is generally contemplated that the receiving portion 80 is operable between an access position 86, an abutting position, and an intermediate position 90 therebetween. In general, the abutting position is defined by the receiving portion 80 being proximate to the cargo floor 12. By way of example, not limitation, the receiving portion 80 is proximate to the cargo floor 12 at least when the storage feature 18 is in both the stored position 74 and the lowered position 34. Accordingly, the abutting position of the receiving portion 80 can generally correspond to either or both of the lowered and stored positions 34 of the storage feature 18. It is generally contemplated that the abutting position may also be used in reference to the support body 32, described further below.

With reference to FIGS. 3-6, the lowered position 34 may correspond to the storage feature 18 being temporarily lowered but not yet stored, and the stored position 74 generally corresponds to the secured repositioning of the storage feature 18 in the lowered position 34. Stated differently, the storage feature 18 may be in the lowered position 34, but not in the stored position 74, but is in the lowered position 34 when in the stored position 74. The receiving portion 80 of the storage feature 18 may include coupling features 92 configured to couple the storage feature 18 to the cargo floor 12. The coupling features 92 may snap-fit with corresponding features of the cargo floor 12. The coupling features 92 may include hooks, clips, snaps, and other coupling features 92 generally known in the art, such that the coupling features 92 are not limited to a snap-fit configuration. The storage feature 18 is in the stored position 74 when the receiving portion 80 is coupled to the cargo floor 12 via the coupling features 92. It is generally contemplated that the coupling features 92 may minimize rattling or other noise between the cargo floor 12 and the storage feature 18 in the stored position 74.

Figure 3:
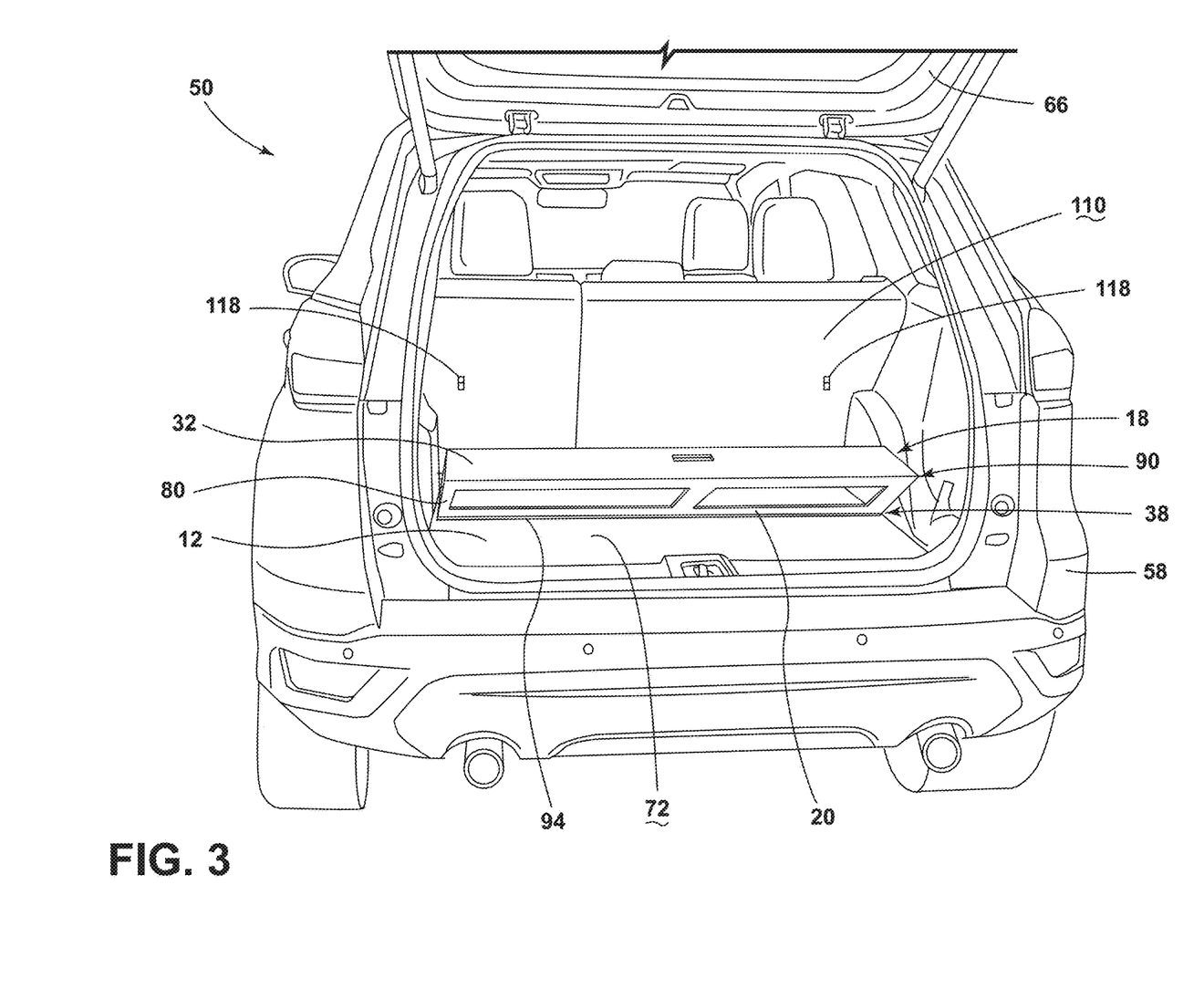
FIG. 3 is a rear perspective view of a storage feature of the present disclosure in an intermediate position.

As mentioned above, the receiving portion 80 is in the abutting position when the receiving portion 80 is proximate to the cargo floor 12. The proximity of the receiving portion 80 and the cargo floor 12 may occur when the storage feature 18 is, at least, in one of the lowered position 34 and/or the stored position 74. The abutting position is specifically defined when at least the first and second openings 82, 84 of the receiving portion 80 are obstructed by the cargo floor 12. The abutting position is illustrated in FIGS. 3 and 4 as when the storage feature 18 is in either the lowered or stored positions 34, 74 as well as the intermediate position 38, even if temporary. However, as described below, the abutting position may also be used to describe the overall configuration and/or specific orientation of the storage feature 18 as a whole. The abutting position will be described in more detail below with respect to FIGS. 8-10.

With further reference to FIGS. 3-7, the base 20 is operably coupled to the recessed surface 72 of the cargo floor 12 via at least one coupling member 94. The coupling member 94 extends along the base 20 and generally outwardly extends from the receiving portion 80 and the base 20 of the storage feature 18 to couple the storage feature 18 to the cargo floor 12. It is contemplated that the at least one coupling member 94 is defined as a living hinge, such that the coupling member 94 may be operably coupled to and integrally formed with the base 20 of the storage feature 18. The at least one coupling member 94 may include a first coupling member 96 and a second coupling member 98. The first coupling member 96 is generally considered to be operably coupled to the base 20 and the receiving portion 80 of the storage feature 18. The second coupling member 98 is generally contemplated to be operably coupled to the receiving portion 80 and the support body 32 of the storage feature 18.

The first coupling member 96 is generally contemplated to define a hinged motion of the storage feature 18 relative to at least the cargo floor 12, such that the storage feature 18 generally rotates about the first coupling member 96. By way of example, and not limitation, as the storage feature 18 transitions from the raised position 36 through the intermediate position 38 and into the lowered position 34, the first coupling member 96 hinges the receiving portion 80 toward the cargo floor 12. At the same time, the second coupling member 98 hinges the support body 32 toward an interior surface 100 of the receiving portion 80 and into the lowered position 34 of the storage feature 18. The first and second coupling members 96, 98 will be described in more detail below with respect to FIGS. 8-10.

With further reference to FIGS. 3-7, the support body 32 includes a first surface 102 and a second surface 104. The first surface 102 of the support body 32 is configured to support user items and/or goods. The second surface 104 generally abuts the interior surface 100 of the receiving portion 80 in, at least, the lowered position 34 and/or the stored position 74 of the storage feature 18. The interior surface 100 of the receiving portion 80 also abuts the second surface 104 of the support body 32 in the abutting position 88. The receiving portion 80 is also configured to receive the user items and/or goods via either of the first and second openings 82, 84 to define additional storage for the storage feature 18. The user goods may be positioned beneath the support body 32 within the receiving portion 80 and may generally be disposed on the raised surface 70 of the cargo floor 12. The positioning of goods within the storage feature 18 beneath the support body 32 and within the receiving portion 80 maximizes the storage capacity within the cargo space 56 of the vehicle 50. The varied heights between the raised surface 70 and the recessed surface 72 of the cargo floor 12 may also provide maximized visibility of the various user goods positioned within the cargo space 56 and stored beneath and upon the storage feature 18.

The rear seating row 64 is illustrated as having a rear surface 110 that defines at least one aperture 112. The at least one aperture 112 can include a first aperture 114 and a second aperture 116 disposed on the rear surface 110 proximate to the support body 32 in the raised position 36 of the storage feature 18. Retention features 118 are disposed within each of the first and second apertures 114, 116 and are configured to transition between a retracted position 120 and an extended position 122. The retention features 118 may be retained within the apertures 112 via a spring mechanism, such that the retention features 118 may be released from the retracted position 120 into the extended position 122 by applying a force F upon the retention features 118. The retention features 118 may be hooks, clips, or any other retention feature generally known in the art. The retention features 118 illustrated in FIG. 7 have a hook configuration and are configured to retain the storage feature 18 in the raised position 36.

Figure 5:
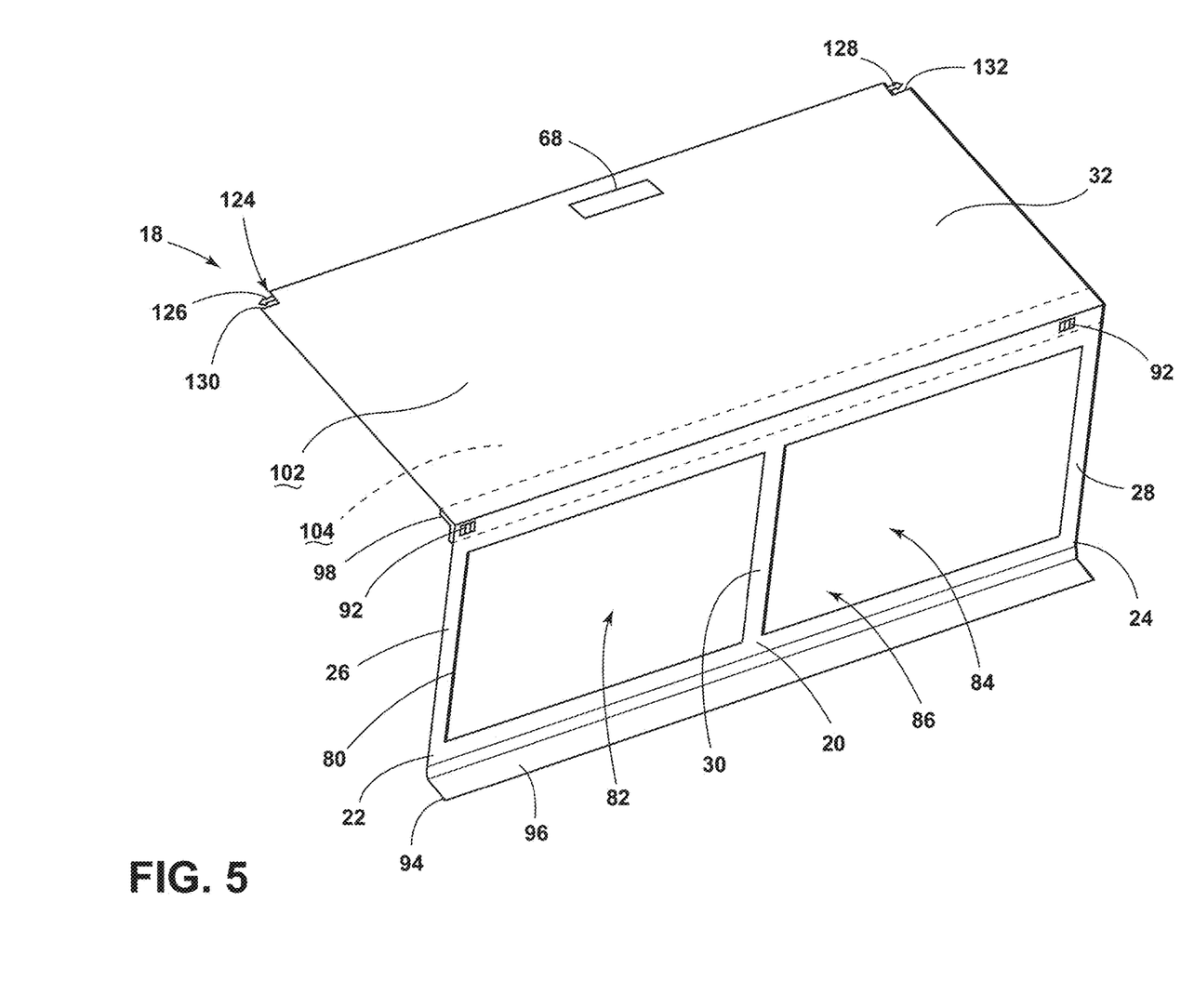
FIG. 5 is a top front perspective view of a storage feature of the present disclosure.
Figure 6:
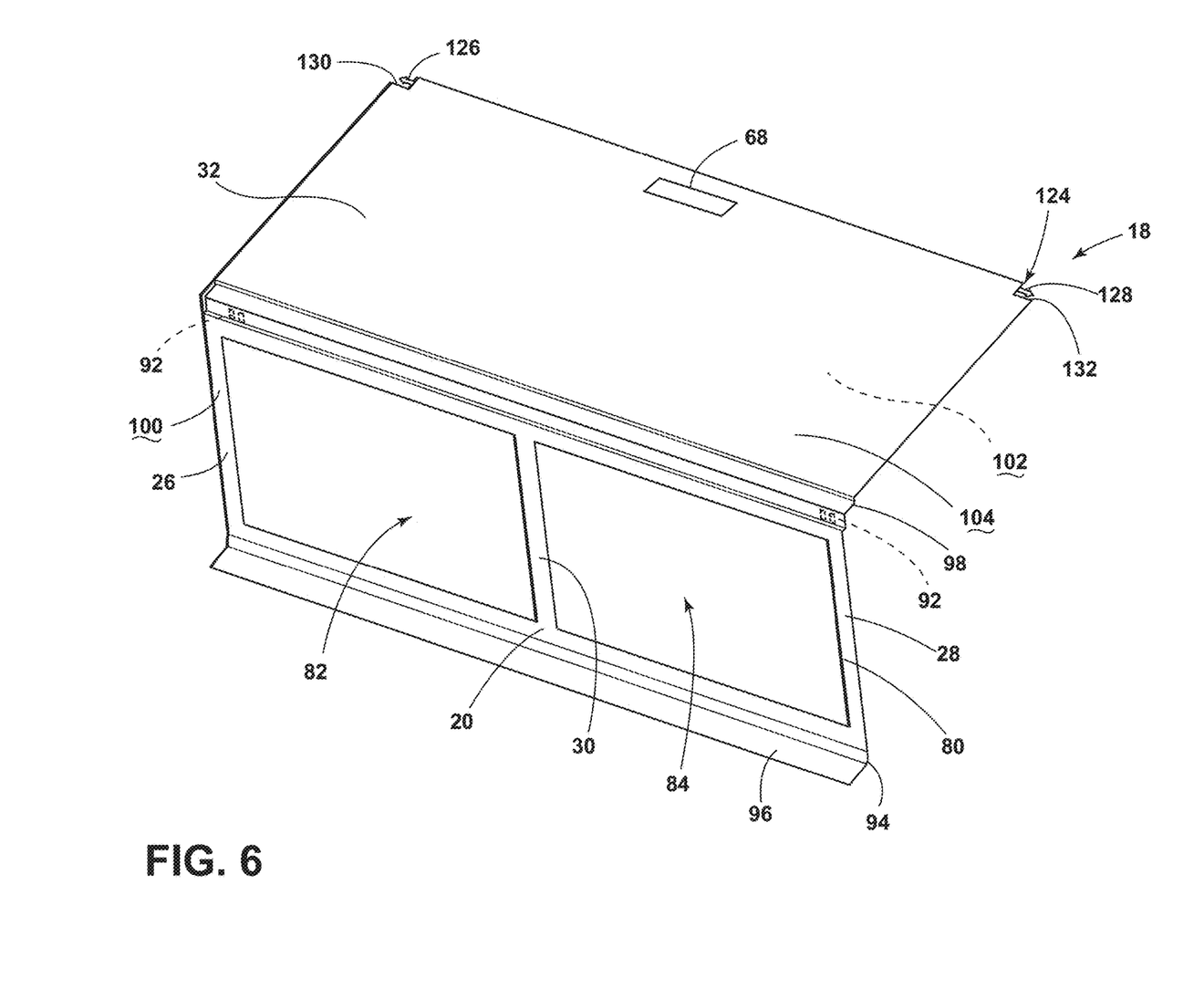
FIG. 6 is a bottom rear perspective view of the storage feature of FIG. 5.
Figure 7:
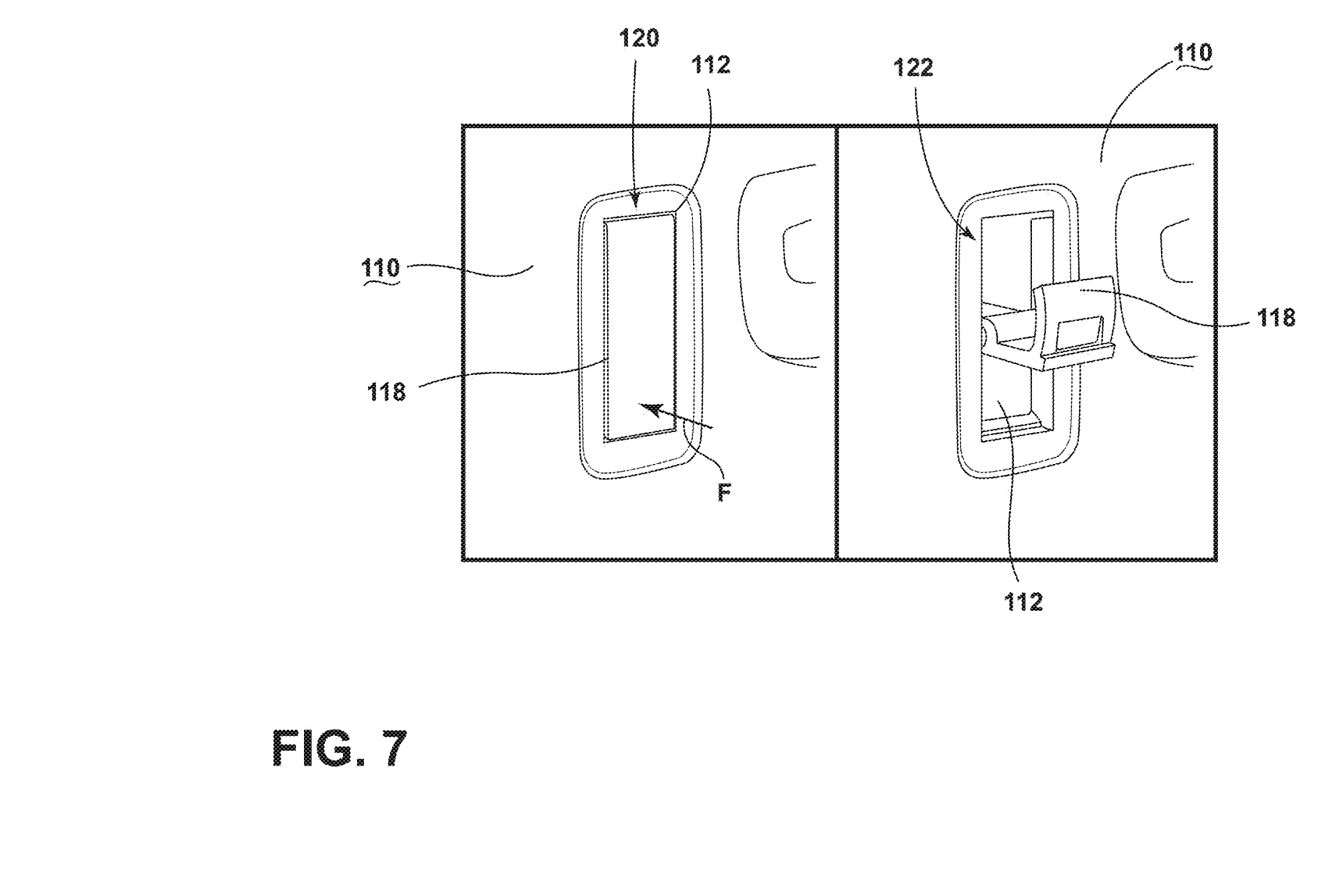
FIG. 7 is an enlarged partial side perspective view of a retention feature of the present disclosure in a retracted position and an extended position.

A retention member 124 is operably coupled to the support body 32 of the storage feature 18 and is selectively coupled to the rear surface 110 of the seating row 64 via the retention features 118. The retention member 124 may be integrally formed with the support body 32 of the storage feature 18, such that the retention member 124 may be disposed on the second surface 104 of the support body 32. The retention member 124 may be a projecting portion of the support body 32 that is generally retained by the retention features 118. Additionally or alternatively, the retention member 124 can include a first retention member 126 and a second retention member 128 that outwardly extend from the support body 32, as illustrated in FIGS. 5 and 6. The support body 32 can define a first notch 130 and a second notch 132 in which the first retention member 126 and the second retention member 128 can be respectively disposed and operably coupled to the support body 32. The first and second retention members 126, 128 are configured to operably couple the support body 32 to the retention features 118.

Figure 8:
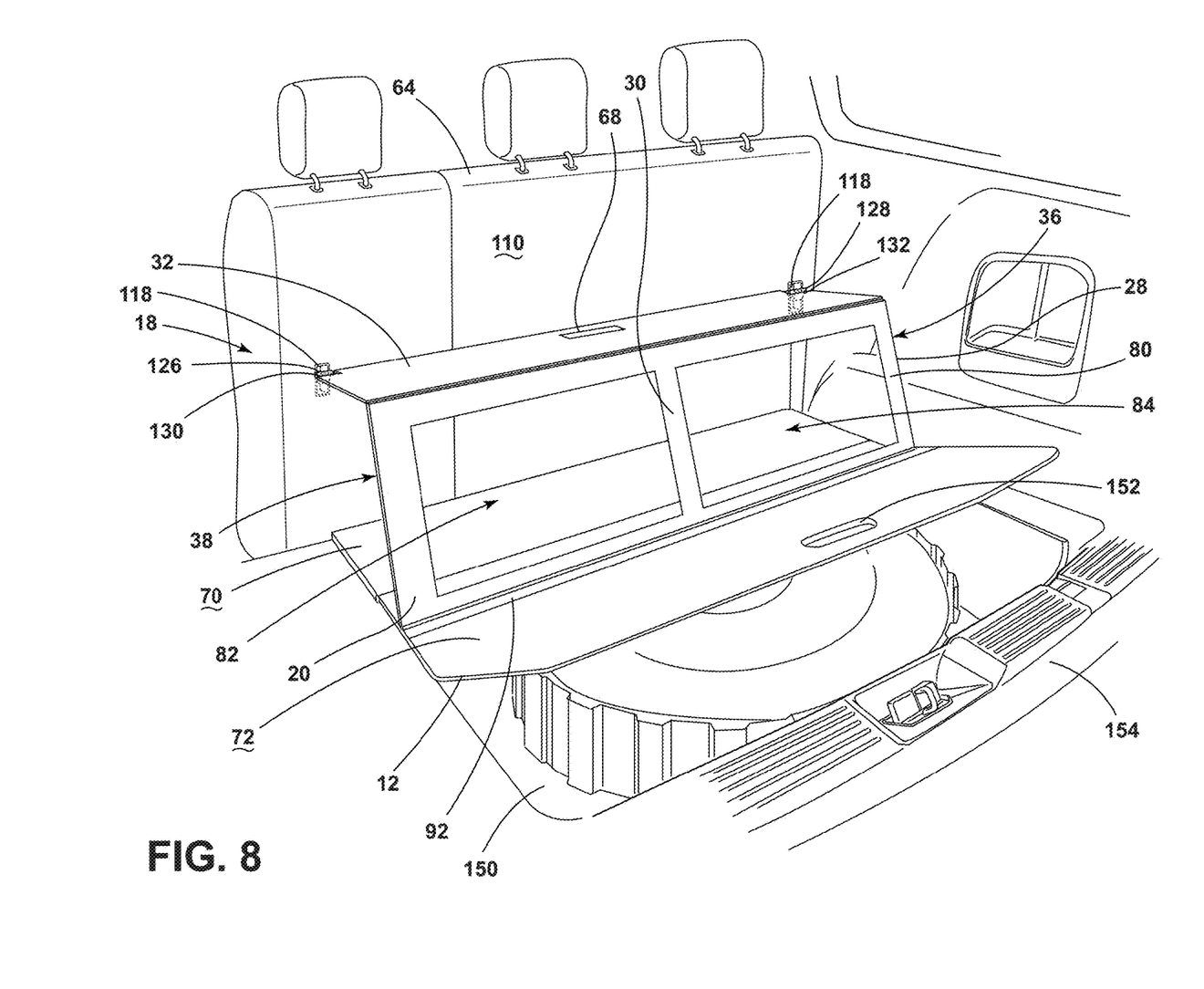
FIG. 8 is an enlarged partial side perspective view of a storage feature of the present disclosure in a raised position and a cargo floor in an open position.
Figure 9:
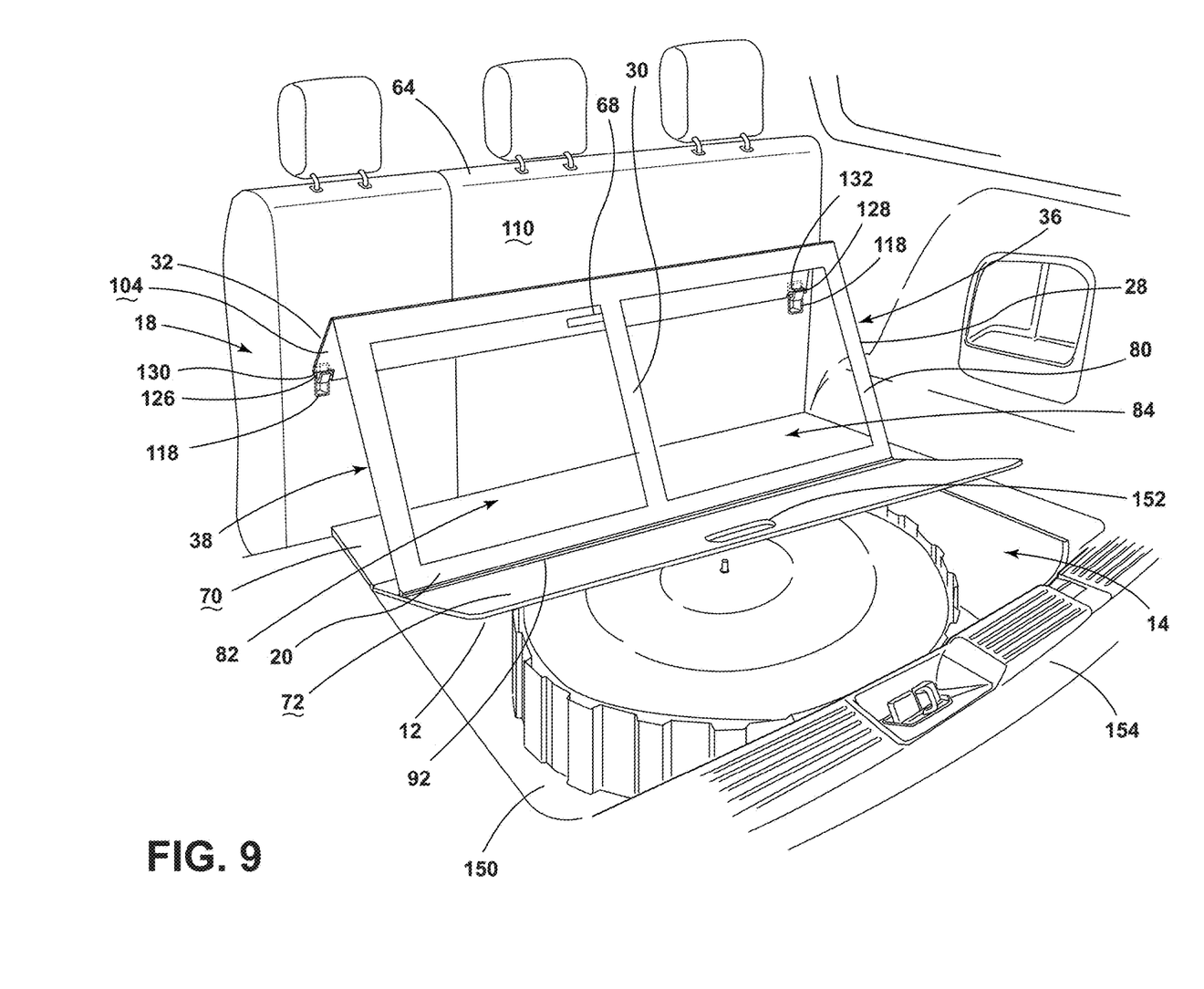
FIG. 9 is an enlarged partial side perspective view of the storage feature of FIG. 8 in an intermediate position with the cargo floor in the open position.
Figure 10:
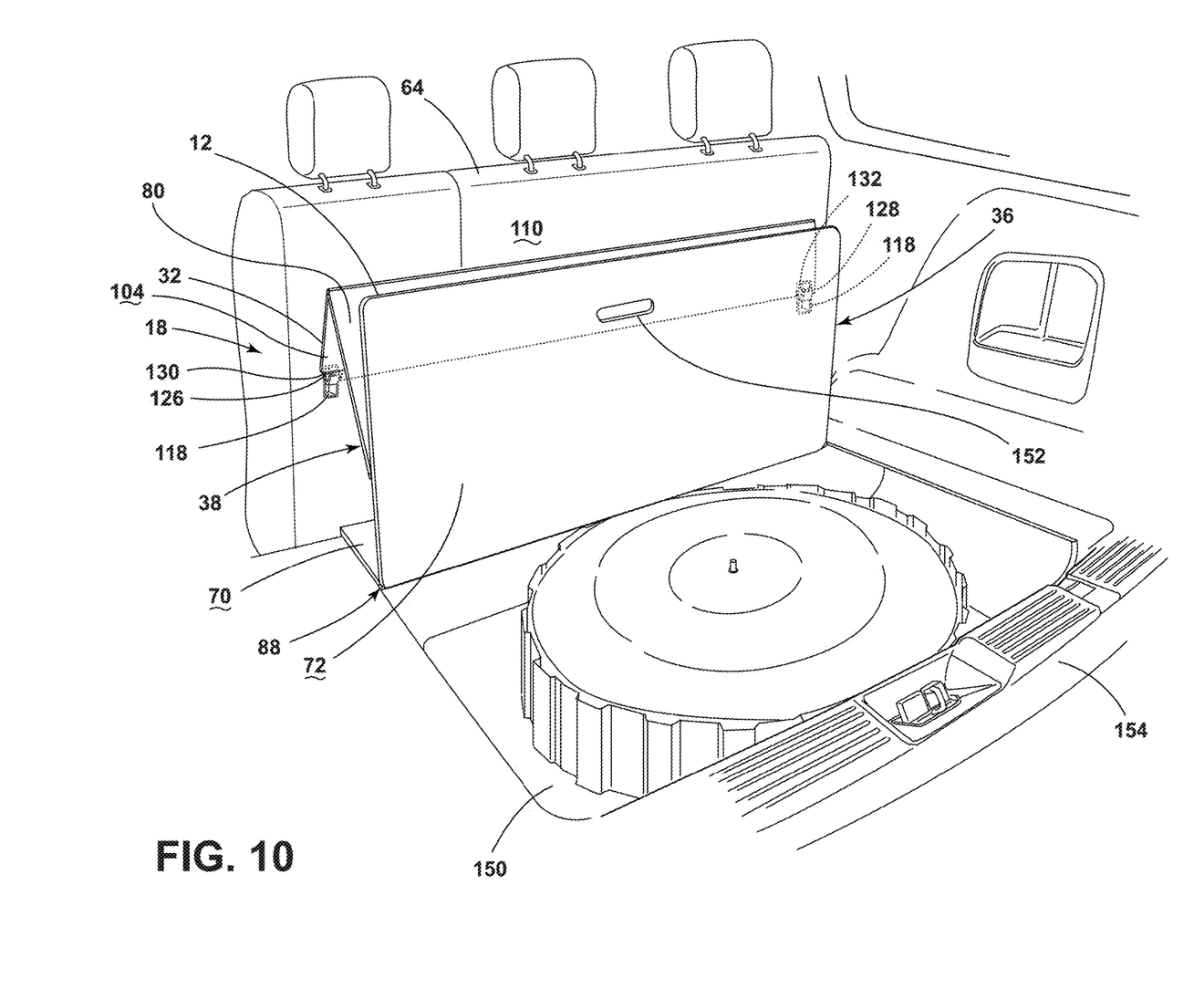
FIG. 10 is an enlarged partial side perspective view of the storage feature of FIG. 9 in an abutting position with the cargo floor in the open position.

Referring now to FIGS. 8-10, the cargo floor 12 is operable between the open position 14 and the closed position 16. A storage cavity 150 is defined by the vehicle body 52 beneath the cargo floor 12. The storage cavity 150 is generally configured to store various items used for utility purposes of the vehicle 50. These utility items may include, but are not limited to, a spare tire or other mechanical pieces. The cargo floor 12 includes a grasping portion 152, which is illustrated as being proximate to a ledge 154 of the vehicle 50. The grasping portion 152 may be an aperture defined in the cargo floor 12 and/or the grasping portion 152 may be integrally formed with the cargo floor 12.

The cargo floor 12 is generally contemplated to be a single body, such that the raised surface 70 and the recessed surface 72 are integrally formed to define the cargo floor 12. It is generally contemplated that the entire cargo floor 12, including the raised surface 70 and the recessed surface 72, transition between the closed position 16 and the open position 14. The user can utilize the grasping portion 152 to translate the cargo floor 12 between the closed and open positions 16, 14 regardless of the position of the storage feature 18. For example, the storage feature 18 may be in either the raised position 36 and/or the lowered position 34 when the cargo floor 12 is operable between the open and closed positions 14, 16.

As illustrated in FIGS. 8-10, the storage feature 18 is depicted in the raised position 36 and is operably coupled to the rear surface 110 of the seating row 64. The user may translate the cargo floor 12 into the open position 14, which brings the cargo floor 12 in closer proximity to the receiving portion 80. Stated differently, the receiving portion 80 of the storage feature 18 may be proximate to the cargo floor 12 in the open position 14 of the cargo floor 12 to define the abutting position 88 mentioned above. Additionally or alternatively, the support body 32 may be in the abutting position 88, when the cargo floor 12 is in the open position 14, such that the support body 32 may be proximate to or abutting the rear surface 110. Thus, the abutting position 88 may be defined as the proximity of the receiving portion 80 to the cargo floor 12, as well as the proximity of the first surface 102 of the support body 32 relative to the rear surface 110 of the seating row 64.

As the cargo floor 12 transitions from the closed position 16 to the open position 14, the support body 32 transitions closer to the rear surface 110 of the seating row 64. The support body 32 is in the abutting position 88 with the rear surface 110 when the cargo floor 12 transitions into the open position 14 with the storage feature 18 in the raised position 36, as illustrated in FIG. 10. It is generally contemplated that the support body 32 may remain coupled to the retention features 118 when the storage feature 18 is in the abutting position 88 and the cargo floor 12 is in the open position 14. By way of example, not limitation, the first retention member 126 and the second retention member 128 remain coupled to the retention features 118 as the cargo floor 12 is raised and lowered.

The first and second retention members 126, 128 are illustrated as generally cylindrical rods that can rotate within each retention feature 118 as the storage feature 18 translates in the raised position 36 to the abutting position 88. Thus, the user may leave the storage feature 18 raised during articulation of the cargo floor 12. Stated differently, the first and second retention members 126, 128, mentioned above, further facilitate the movement of the storage feature 18 between the raised position 36 and the abutting position 88. The first and second retention members 126, 128 may be separate features coupled to the support body 32 or may be integrally formed with the support body 32 of the storage feature 18.

With further reference to FIGS. 8-10, the first coupling member 96 coupled to the base 20 and the receiving portion 80 maintains the connection between the storage feature 18 and the cargo floor 12 during articulation of the cargo floor 12. The first coupling member 96 allows the storage feature 18 to be lowered toward the cargo floor 12 and allows the cargo floor 12 to be raised toward the storage feature 18. The second coupling member 98 provides a dual hinge configuration of the storage feature 18, such that the second coupling member 98 hinges in an opposing direction as compared to the first coupling member 96. Stated differently, the first and second coupling members 96, 98 define a Z-shaped configuration of the storage feature 18, such that the storage feature 18 may hinge at two locations and in two directions. This dual hinge configuration accommodates the various positions of the storage feature 18 relative to the cargo floor 12.

Referring again to FIGS. 1-10, the storage feature 18 is configured to provide selective and variable storage within the cargo space 56 defined by the vehicle 50. The variable storage options available to the user. As a result, the storage feature 18 generally maximizes the storage options within the cargo space 56. The user can have the storage feature 18 in the raised position 36 to utilize the support body 32 as a support surface. In addition, the cargo floor 12 beneath the storage feature 18 may be utilized as additional storage bypassing items through the first and second openings 82, 84 of the receiving portion 80. The inclusion of the first and second coupling members 96, 98 provides added flexibility to the configuration of the storage feature 18, such that the user may leave the storage feature 18 in the raised position 36 while transitioning the cargo floor 12 between the open position 14 and the closed position 16. The first and second coupling members 96, 98 allow the storage feature 18 to transition while in the raised position 36 into the abutting position 88, while remaining coupled to the retention features 118 via the retention member 124. The overall flexibility and variety of the positions of the storage feature 18 provides maximized cargo storage while maintaining the accessibility of the utility features within the storage cavity 150 beneath the cargo floor 12.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle storage assembly, comprising:
   a cargo floor operable between an open position and a closed position; and
   a storage feature operably coupled to the cargo floor, the storage feature comprising:
   a base having a first end and a second end;
   a first supporting member operably coupled to the first end of the base;

a second supporting member operably coupled to the second end of the base;

a central support operably coupled to the base between the first supporting member and the second supporting member; and a support body operably coupled to the central support and the first and second supporting members, the support body operable to be positioned between a first position, a second position, and an intermediate position therebetween, wherein the central support and t first and second supporting members comprise a receiving portion of the storage feature, and wherein a first opening is defined by the first supporting member and the central support and a second opening is defined by the second supporting member and the central support, and wherein the receiving portion of the storage feature is proximate to the cargo floor in the open position of the cargo floor, and wherein the receiving portion is proximate to the cargo floor in the first position of the support body.

2. The vehicle storage assembly of claim 1, wherein the first position of the support body is a lowered position and the second position of the support body is a raised position, and wherein the support body is in the intermediate position when the cargo floor is in the open position.

3. A vehicle storage assembly, comprising:

a cargo floor operable between an open position and a closed position:

a storage feature operably coupled to the cargo floor, the storage feature comprising:

a base having a first end and a second end:

a first supporting member operably coupled to the first end of the base;

a second supporting member operably coupled to the second end of the base;

a central support operably coupled to the base between the first supporting member and the second supporting member; and a support body operably coupled to the central support and the first and second supporting members, the support body positioned between a first position, a second position, and an intermediate position therebetween:

a seating row having a rear surface that defines apertures:

retention features operably coupled to the rear surface of the seating row and selectively disposed within the apertures in a retracted position of the retention features; and a retention member operably coupled to the support body of the storage feature and selectively coupled to the retention features, wherein the retention member is coupled to the retention features in the second position of the support body.

4. A vehicle, comprising:

a seating row having a rear surface;

a cargo floor proximate to the rear seating row;

retention features operably coupled to the rear surface of the rear seating row;

a storage feature selectively coupled to the retention features and including a base operably coupled to the cargo floor, a receiving portion, and a support body operably coupled to the receiving portion via at least one coupling member, wherein the storage feature is operable between a first position and a second position; and a retention member operably coupled to the support body of the storage feature and selectively coupled to the rear surface of the seating row via the retention features.

5. The vehicle of claim 4, wherein the rear surface of the seating row defines apertures, and wherein the retention features are disposed within the apertures in a retracted position.

6. The vehicle of claim 4, wherein the at least one coupling member includes a first coupling member operably coupled to the base and the receiving portion of the storage feature and a second coupling member operably coupled to the receiving portion and the support body of the storage feature.

7. The vehicle of claim 4, wherein the first position of the storage feature is defined by the receiving portion being adjacent to the cargo floor, and wherein the second position is defined as a support position of the storage feature.

8. The vehicle of claim 4, wherein the first position is a stored position and an abutting position, and wherein the storage feature is planar with the cargo floor in the stored position and the storage feature is proximate to the rear surface of the seating row in the abutting position.

9. The vehicle of claim 4, wherein the receiving portion includes a support member and one or more openings defined in part by the support member.

* * * * *

UNITED STATES PATENT AND TRADEMARK OFFICE
CERTIFICATE OF CORRECTION

PATENT NO. : 11,458,903 B2  
APPLICATION NO. : 16/950990  
DATED : October 4, 2022  
INVENTOR(S) : Anaya It is certified that error appears in the above-identified patent and that said Letters Patent is hereby corrected as shown below:

In the Claims

Column 11:
    Claim 1, Line 1;
        "and t" should be --and the--.
    Claim 3, Line 31;
        "end:" should be --end;--.
    Claim 3, Lines 42-43;
        "therebetween:" should be --therebetween;--.
    Claim 3, Line 44;
        "apertures:" should be --apertures;--.

Signed and Sealed this  
Sixth Day of December, 2022

Katherine Kelly Vidal  
*Director of the United States Patent and Trademark Office*